June 29, 1926.
H. F. NEUMEYER
FAUCET
Filed Feb. 23, 1923
1,590,251
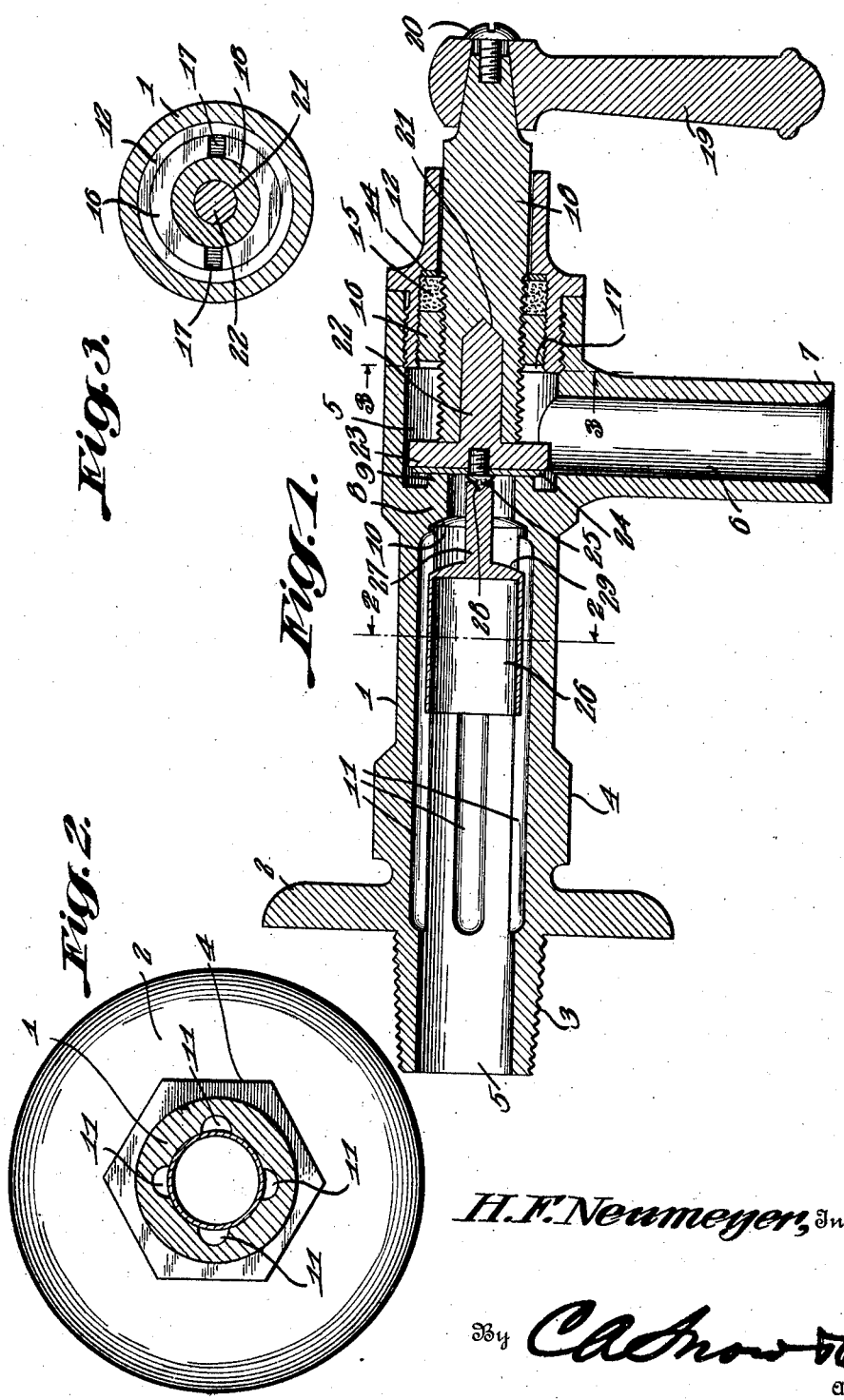
H. F. Neumeyer, Inventor
By C. A. Snow & Co.
Attorneys Patented June 29, 1926.

1,590,251

UNITED STATES PATENT OFFICE.

HORACE FALK NEUMEYER, OF MACUNGIE, PENNSYLVANIA.

FAUCET.

Application filed February 23, 1923. Serial No. 620,731.

This invention aims to provide a faucet so constructed that when the operating member is removed, to permit a renewal of the perishable valve foot, it will be unnecessary to close off the water by means of a separate valve, the faucet embodying means whereby the water will be cut-off automatically, it being a matter of common knowledge that the cut-off device often is located in a basement, or at considerable distance from the particular faucet which is to be repaired.

Another object of the invention is so to construct the faucet that the valve will not rotate when the valve is seated, a wearing and a cutting of the valve being avoided and the valve having, merely, a right line movement toward and away from its seat.

A further object of the invention is so to construct the faucet that when the main valve is opened fully, the auxiliary valve will close, thereby shutting off the flow of water or other liquid.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a device constructed in accordance with the invention; Figure 2 is a cross section on the line 2—2 of Figure 1; Figure 3 is a cross section on the line 3—3 of Figure 1, remote parts being omitted.

The body of the faucet comprises a tubular member 1 which may carry a base plate 2, the tubular member having any ordinary connecting means 3, and being provided with the common wrench head 4. The tubular member 1 has a longitudinal passage 5 communicating with the bore 6 of a spout 7. Within the tubular member 1 is located an annular partition 8 having a projecting outer seat 9 and a concaved inner seat 10. Longitudinal by-pass ducts 11 are formed in the tubular member 1 and are located between the intake end of the tubular member and the partition 8, the by-pass ducts communicating with the passage 5.

The faucet comprises a head detachably secured to the body, the head including a cap 12 threaded into the tubular member 1, a washer 14, of metal or the like, being seated in the cap 12 and forming an abutment for a compressible packing 15 disposed within the cap. A ring nut 16 is threaded into the inner end of the cap 12 and compresses the packing 15, the ring nut having kerfs 17 whereby it may be rotated conveniently.

An operating member, such as a stem 18 is rotatable in the cap 2 and is threaded into the ring nut 16, the stem 18 being actuated by any suitable means, such as a handle 19, secured detachably to the stem as indicated at 20. In its inner end, the stem 18 is supplied with an axial bearing recess 21 wherein the spindle 22 of a main valve 23 is journaled, a renewable disk-like foot 24, generally made of fiber or rubber, being detachably mounted on the valve, by means of a screw 25, or otherwise, the foot constituting part of the valve. The foot 24 of the valve 23 is adapted to cooperate with the seat 9.

An auxiliary valve 26, which may be cup-shaped, is mounted slidably in the passage 5 between the partition 8 and the intake end of the tubular member 1, the valve having a stem 27 provided with a depression 28 adapted to cooperate with the screw 25 of the main valve 23, the valve 26 having an end wall 29 which is convexed to fit tightly upon the concaved inner seat 10.

When the parts are arranged as shown in Figure 1, the main valve 23 holds the auxiliary valve 26 spaced from the seat 10. When the head of the faucet, including the cap 12, is removed along with the stem 18 and the valve 23, to permit a renewal of the foot 24, the valve 26 moves to the right in Figure 1, under the action of the flowing water, the wall 29 of the valve cooperating with the seat 10 and cutting off the flow of water, the valve 26 closing the more readily, under the action of the flowing water, because the valve is cup-shaped. It will be obvious from the foregoing that when it is desired to renew the foot 24 of the valve 23, it is unnecessary for the operator to retire to a remote point and shut off the supply of water, the valve 26 cutting off the flow of water, when the head of the faucet and parts carried thereby are removed.

It is to be observed that the valve 23 is rotatably mounted on the stem 18. Consequently when the stem 18 is advanced and rotated, the valve 23 does not participate in the rotary movement of the stem. Consequently, the valve 23 has substantially a right line movement toward and away from the seat 9, the foot 24 having no rotary movement with respect to the seat 9, and the wear on the foot 24 being reduced accordingly.

In the ordinary operation of the faucet, as the valve 23 retires from the seat 9, the valve 26 advances toward the seat 10, water passing about the valve 26, through the by-pass ducts 11, and emerging through the bore 6 of the spout 7. When the valve 23 arrives at a fully opened position, the wall 29 of the valve 26 engages the seat 10 and practically cuts off the flow of water through the spout 7. This operation is desirable for a number of reasons, one of which is that a person cannot open the valve 23 fully, and leave the water running full head, to over flow a basin, bath-tub or the like into which the spout 7 discharges.

What is claimed is:—

A faucet comprising a body having a lateral spout and provided with an internal seat, a main valve, a disk-like foot on the main valve and engaging the seat, the spout and the main valve being located on one side of the seat, a screw connecting the disk-like foot with the main valve and having a head provided with a kerf, an operating member having threaded connection with the body and carrying the main valve, and an auxiliary valve located on the opposite side of the seat and cooperating therewith, the auxiliary valve including a reduced stem provided with a depression into which the head of the screw fits, the kerf of the screw head being housed in the depression.

In testimony that I claim the foregoing as my own, I have hereto affixed my signature.

HORACE FALK NEUMEYER.